Nov. 17, 1931.  B. R. BENJAMIN  1,831,989
TRACTION WHEEL
Filed July 22, 1929   2 Sheets-Sheet 1
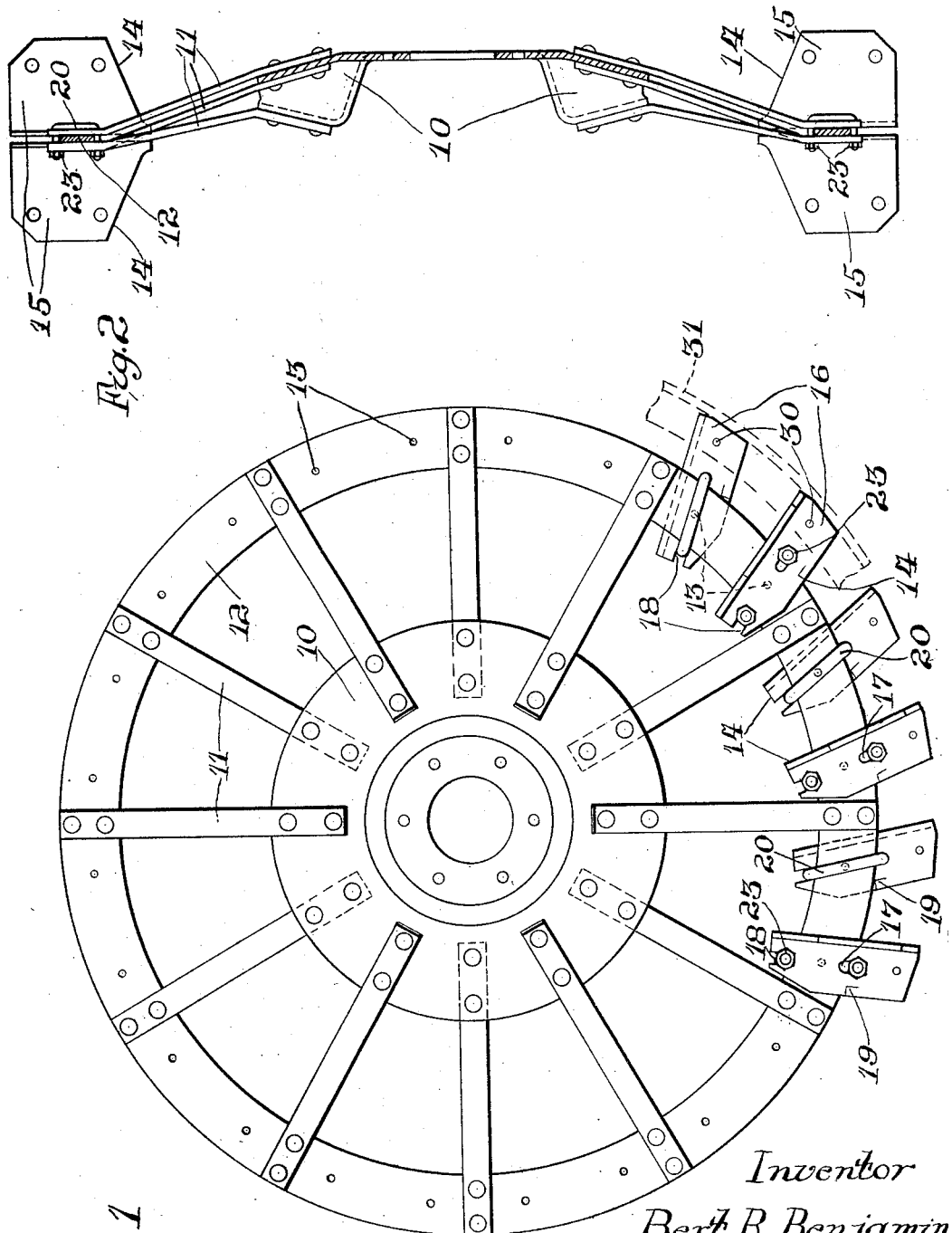
Inventor
Bert R. Benjamin
By H.P. Aeolite
Att'y.

Nov. 17, 1931.  B. R. BENJAMIN  1,831,989
TRACTION WHEEL
Filed July 22, 1929  2 Sheets-Sheet 2
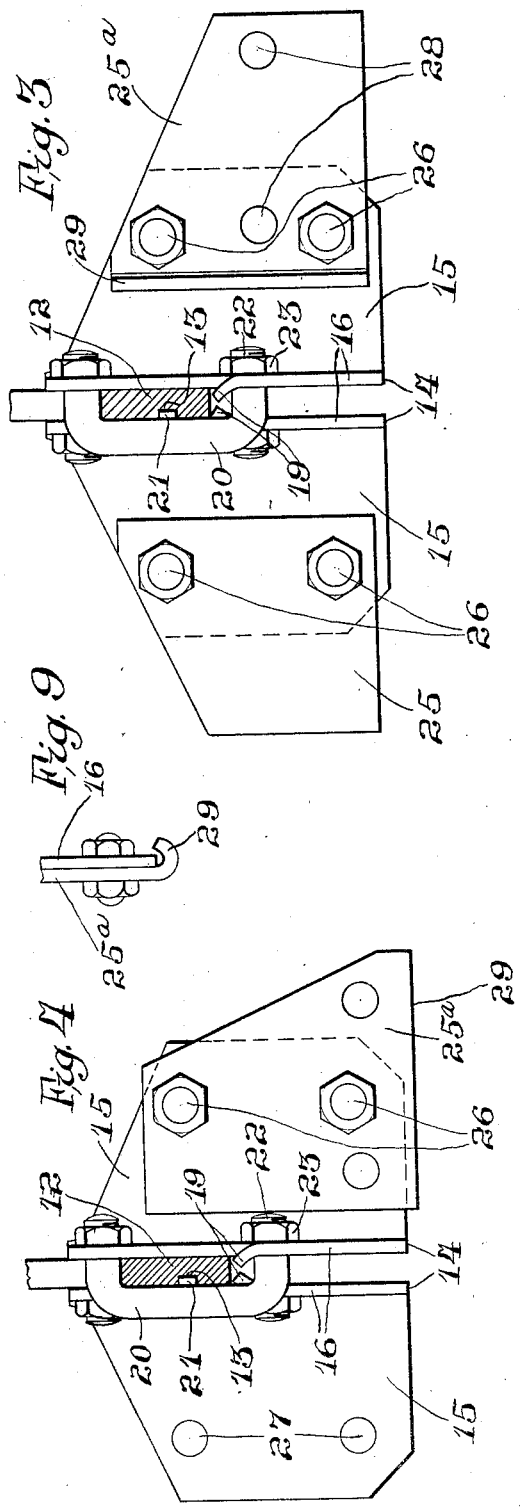
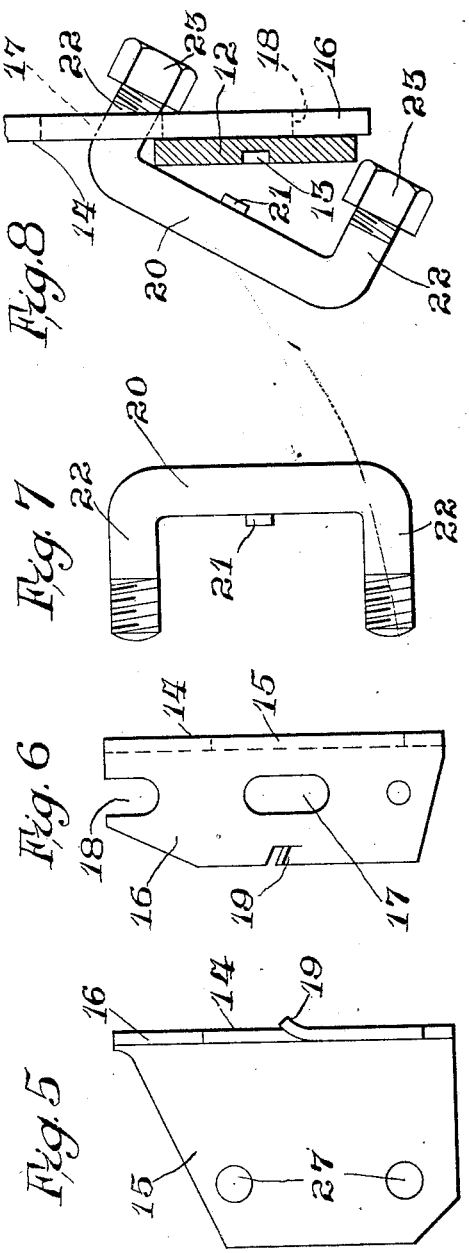
Inventor
Bert R. Benjamin
By  H. P. Doolittle
Atty.

Patented Nov. 17, 1931

1,831,989

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTION WHEEL

Application filed July 22, 1929. Serial No. 380,183.

The present invention relates to the construction of the tread portion of traction wheels and to an improved traction lug structure and manner of mounting.

The principal object of the invention is to provide a tread which will be readily adaptable to different soil conditions while particularly adapted for obtaining efficient traction on soft, sticky soil without objectionable packing of the soil on the lugs and tread.

Another object is to provide a lug having securing means constructed to permit quick connection and disconnection and a certain range of angular adjustment of the lug in a radial plane.

The invention is here illustrated as embodied in a wheel structure comprising a single rim-plate having its width extending at right angles to the axis of the wheel with lugs of novel type secured to the sides of the plate, and the invention accordingly resides in the organization and details of construction of such a wheel tread as hereinafter more specifically described and claimed, and illustrated in the accompanying drawings, where:

Figure 1 is a side elevational view of a traction wheel showing a series of lugs in position on the rim plate or tread;

Figure 2 is a transverse section of a wheel with lugs in position on the rim plate;

Figure 3 is a detail view of the wheel tread in transverse section showing lugs equipped with auxiliary blades;

Figure 4 is a similar view showing a modified arrangement of the auxiliary blades on the lug;

Figure 5 is a detail view of a lug;

Figure 6 is a similar view of a lug viewed at right angles to Figure 5;

Figure 7 is a detail view of a fastening element or U-bolt for securing the lugs;

Figure 8 is a detail, sectional view illustrating the manner of connecting and disconnecting a lug; and, Figure 9 is a detail of the lug arrangement shown in Figure 4 as viewed from the side.

As illustrating a preferred form of the invention there may be employed a traction wheel comprising a disk-like hub portion 10 having a scalloped margin from which there extend radiating spokes 11, certain of which are alternately secured to opposite sides of the hub 10 and to opposite sides of an annular rim plate 12, which is preferably offset laterally from the plane of the hub and which has its width extended in a plane at right angles to the axis of the wheel, as clearly illustrated in Figures 1 and 2.

The rim plate 12 is formed with circumferentially spaced, cylindrical openings 13 located midway between its inner and outer edges for a purpose to be described. The rim plate 12 is designed to carry a series of traction lugs 14 which are preferably arranged at an angle to the radius of the wheel and alternately secured in spaced offset relation to opposite sides of the rim plate in the manner shown in Figure 1. Each lug 14 is preferably formed with angularly related webs, there being a wider web 15 and a narrower web 16, the latter of which is designed for connection to the rim plate with the web 15 extending outwardly therefrom. The lugs may conveniently be cut from angle iron or steel shapes. Each lug is of such length as to project beyond the outer edge of the rim plate 12 with its inner end also extending inwardly of the rim to some extent. The web 16, which engages one side of the rim plate, is formed with an intermediate, longitudinally extending slot 17 and with a notch 18 in its inner end. The slot 17 is so located as to intersect the outer edge of the rim plate 12 when the lug is in position thereon, and the notch 18 will then lie adjacent the inner edge of the rim. The web 16 of the lug is also provided with a shoulder 19 which is preferably formed by striking out a portion of the metal at the longitudinal edge of the rim opposite the slot 17. This shoulder is positioned to engage the outer edge of the plate 12 when the lug is in position.

The lug is clamped to one side of the rim 12 by means of a clamping member or U-bolt 20, the transverse portion of which is provided with a central pintle 21 between the parallel arms 22 of the U-bolt. The pintle 21 engages an aperture 13 in the rim plate above referred to, and the arms 22 respectively engage the slot 17 and notch 18 in the web 16 of the lug positioned on the opposite side of the plate. The arms 22 there carry fastening or clamping means preferably consisting of nuts 23 on the ends of the arms 22. There is thus provided a clamping member which embraces rim plate 12 and secures a lug thereto in a manner permitting angular adjustment of the lug in a radial plane and also permitting easy attachment and detachment of the lug therefrom. This facility of adjustment and mounting is due to the fact that the length of the U-bolt 20 is somewhat greater than the width of the rim 12, thereby permitting the lug to be rocked on the rim when the nuts 23 are loosened, with the shoulder 19 as a fulcrum, the U-bolt 20 at the same time pivoting on the pintle 21 while its ends have sliding movement in the slot 17 and notch 18. It is also possible to remove the lug from the rim without separating the U-bolt from the lug, by loosening the nuts 23 and slipping the lug outwardly to release the lower arm of the U-bolt from the notch 18, as illustrated in Figure 8.

In a modified form of the lug shown in Figures 3, 4 and 9, there is provided an auxiliary wing or plate 25 which is fastened by means of bolts 26 to the web 15 of the lug, which is provided with spaced apertures 27 for reception of the bolts.

The auxiliary plate 25 may be of the form shown at the left hand side of Figure 3, but preferably is constructed as shown at the right hand side of that figure. In this preferred construction, an auxiliary plate 25a is formed with a second pair of bolt apertures 28 which are on a line at right angles to the apertures in the edge of the plate, and positioned to permit the auxiliary plate 25a to be connected to the web 15 in either of two positions, as illustrated in Figures 3 and 4. In this construction of the plate 25a, one edge thereof is rolled, as shown at 29, so that, when the plate is reversed as shown at the right hand side of Figure 4, the rolled edge will overhang the outer edge of the web 15 and provide a non-cutting tread surface for use on hard roads or sodded ground. As further provision for travel on hard roads, each web 16 may be provided with a bolt opening 30 to register with similar openings in an overtire 31 (Figure 1) which may be formed of angle iron with one web extending between the lugs.

It will be seen from the foregoing description that a wheel tread is provided which is free of closed pockets in which sticky soil is likely to be retained, while affording a tread surface having an over all width amply sufficient to support a tractor on which the wheel is used in soft or muddy soil. The structure also provides an arrangement of lugs which may be adjusted and varied in structure and width to meet the various soil conditions incidental to use of farm tractors. The preferred embodiment above described is capable of modification without departure from the spirit of the invention as defined in the following claims.

What is claimed as new is:

1. In a traction wheel, the combination of a rim plate positioned at right angles to the axis of the wheel, a lug extending outwardly across the rim plate and having a flat portion engaging one side of the rim plate, said portion being formed with a slot intermediate its ends and with a notch in one end, a clamping member engaging the opposite side of the rim plate and having angular extensions respectively seated in the notch and slot, and fastening means on said ends.

2. In a traction wheel, the combination of a rim plate positioned at right angles to the axis of the wheel, an angle iron lug extending outwardly across the rim plate with a web engaging one side of the rim plate and formed with a slot intermediate its ends and with a notch at the inner end of said web, a U-bolt embracing the rim plate and having its arms extending through said slot and notch respectively, and clamping means on the arms of the U-bolt.

3. In a traction wheel, the combination of a rim plate positioned at right angles to the axis of the wheel, a radially disposed angle iron lug with a web engaging one side of the rim plate and projecting beyond both edges thereof, said web being formed with a slot intermediate its ends and with a notch in its inner end, a shoulder on the lug in engagement with the outer edge of the rim plate, a U-bolt embracing the rim plate and having its arms extending through said slot and notch respectively, and clamping means on the arms of the U-bolt.

4. In a traction wheel, the combination of a rim plate positioned at right angles to the axis of the wheel, a lug having a flat portion engaging one side of the rim plate and projecting beyond both edges thereof, said lug being formed with a longitudinal slot intermediate its ends and having a lateral projection engaging the outer edge of the rim plate, and clamping means pivotally engaged with the rim plate and passing through the slot in the lug, whereby the lug may be angularly adjusted about said lateral projection as a pivot.

5. In a traction wheel, the combination of a rim plate positioned at right angles to the axis of the wheel and formed with circumferentially spaced apertures, radially disposed lugs having flat portions engaging one side of the rim plate over the apertures and projecting beyond both edges of the rim plate, said flat portions each being formed with a slot intermediate its ends intersecting the outer edge of the rim plate and with a notch in the inner end, clamping members embracing the rim plate and having pintles respectively seated in the apertures of the rim plate and extensions seated in the slots and notches of the flat portions of the lugs, and fastening means on said extensions.

In testimony whereof I affix my signature.

BERT R. BENJAMIN.